(12) United States Patent
Egner et al.

(10) Patent No.: US 11,118,702 B2
(45) Date of Patent: Sep. 14, 2021

(54) VALVE WITH ENERGY-SAVING ELECTRODYNAMIC ACTUATOR

(71) Applicant: BUERKERT WERKE GMBH & CO. KG, Ingelfingen (DE)

(72) Inventors: Ralf Egner, Ingelfingen (DE); Johannes Baumann, Ingelfingen (DE); Patrick Mohs, Ingelfingen (DE); Markus Klaiber, Ingelfingen (DE); Rainer Kuenzler, Ingelfingen (DE); Ralf Scheibe, Ingelfingen (DE)

(73) Assignee: BUERKERT WERKE GMBH & CO. KG

( * ) Notice: Subject to any disclaimer, the term of this patent is extended or adjusted under 35 U.S.C. 154(b) by 42 days.

(21) Appl. No.: 16/513,405

(22) Filed: Jul. 16, 2019

(65) Prior Publication Data

US 2020/0025307 A1    Jan. 23, 2020

(30) Foreign Application Priority Data

Jul. 23, 2018  (DE) ...................... 10 2018 117 735.6

(51) Int. Cl.
| | |
|---|---|
| *F16K 31/06* | (2006.01) |
| *F16K 99/00* | (2006.01) |
| *H01F 7/20* | (2006.01) |
| *H01F 7/06* | (2006.01) |
| *F16K 31/08* | (2006.01) |
| *H01F 7/122* | (2006.01) |

(52) U.S. Cl.
CPC ...... *F16K 31/0682* (2013.01); *F16K 31/0641* (2013.01); *F16K 31/0675* (2013.01); *F16K 31/082* (2013.01); *F16K 99/0001* (2013.01); *H01F 7/066* (2013.01); *H01F 7/122* (2013.01); *H01F 7/20* (2013.01); *H01F 2007/068* (2013.01)

(58) Field of Classification Search
CPC ............... F16K 31/082; F16K 31/0675; F16K 99/0046; F16K 99/0051; F16K 2099/0069; H01F 7/122; H01F 7/066
See application file for complete search history.

(56) References Cited

U.S. PATENT DOCUMENTS 3,212,751 A * 10/1965 Hassa .................. F16K 31/086
                                                       251/65
3,532,121 A * 10/1970 Sciortino .............. F16K 31/082
                                                      137/625.4
(Continued)

FOREIGN PATENT DOCUMENTS

| DE | 19941109 | 2/2012 | ............. G11B 21/02 |
| DE | 102014113103 | 3/2016 | ............. F16K 31/06 |

(Continued)

*Primary Examiner* — Umashankar Venkatesan
(74) *Attorney, Agent, or Firm* — Hayes Soloway P.C.

(57) ABSTRACT

A valve includes an electrodynamic actuator which has a magnet arrangement for generating a magnetic field and a control element movable relative to the magnet arrangement. The control element includes an energizable coil which is arranged in the magnetic field and is firmly coupled to a coil carrier. The control element is movable between at least two defined positions. There are provided permanent-magnetically interacting holding force which retain the control element in at least one of the defined positions, even when the coil is currentless.

22 Claims, 8 Drawing Sheets

(56) References Cited

U.S. PATENT DOCUMENTS

| | | | | |
|---|---|---|---|---|
| 4,664,355 A | * | 5/1987 | Kubach | H01F 7/1646 |
| | | | | 251/129.09 |
| 5,094,218 A | * | 3/1992 | Everingham | F02M 26/53 |
| | | | | 123/568.26 |
| 5,362,027 A | * | 11/1994 | Champaigne | F16K 1/12 |
| | | | | 137/251.1 |
| 6,532,136 B2 | | 3/2003 | Bae et al. | 360/256.2 |
| 9,312,058 B2 | | 4/2016 | Michaelsen et al. | H01F 7/1805 |
| 9,482,360 B2 | * | 11/2016 | Bantz | F16K 31/06 |
| 10,054,244 B2 | * | 8/2018 | Querejeta Andueza | |
| | | | | F23N 5/245 |
| 2012/0090177 A1 | * | 4/2012 | Andueza | F16K 31/082 |
| | | | | 29/890.124 |
| 2015/0069860 A1 | * | 3/2015 | Reiter | F04B 19/006 |
| | | | | 310/12.16 |

FOREIGN PATENT DOCUMENTS

| | | | | |
|---|---|---|---|---|
| WO | WO2010066459 | 6/2010 | | F16K 99/00 |
| WO | WO2012079572 | 6/2012 | | H01F 7/066 |

\* cited by examiner

VALVE WITH ENERGY-SAVING ELECTRODYNAMIC ACTUATOR

CROSS-REFERENCE TO RELATED APPLICATIONS

This application is a U.S. non-provisional application claiming the benefit of German Patent Application No. 10 2018 117 735.6, filed on Jul. 23, 2018, which is incorporated herein by its entirety.

FIELD OF INVENTION

The invention relates to a valve with an electrodynamic actuator.

BACKGROUND OF THE INVENTION

In fluid valve technology electromagnetic actuators are frequently used. In most of these actuators an armature made of magnetic material is moved by means of a magnetic field which is produced by a coil. In particular with a desired miniaturization the possibilities of a space-saving construction on the one hand and of providing enough magnetic force on the other hand are limited. This is due to the fact that with increasingly smaller coils the achievable magnetic field strength decreases strongly or the maximum possible current is limited.

In electrodynamic drives, on the other hand, the magnetic field strength depends on the volume of the permanent magnets used in the drive, wherein a reduction of the volume of the permanent magnets has comparatively less influence on the magnetic field strength available in the drive than the reduction of the coil size in an electromagnetic actuator.

From WO 2010/066459 A1 a microvalve with a powerful electrodynamic actuator is known, which can be operated with low electric voltage. The actuator includes a linearly movably mounted control element with a spiral conductor path printed thereon. On energization of the conductor path a magnet arrangement exerts a Lorentz force on the control element with the spiral conductor path, whereby the same is deflected. A return element is not provided, as the return is to be achieved by a reversal of the current flow direction.

DE 10 2014 113 103 A1 discloses an electrodynamic actuator suitable for miniature applications, in particular for a microvalve or a micropump. The electrodynamic actuator comprises a magnet arrangement for generating a magnetic field and a control element movable relative to the magnet arrangement. The control element includes an energizable air coil which is arranged in the magnetic field and is firmly coupled to a coil carrier made of a non-magnetic material.

SUMMARY OF THE INVENTION

A valve, in particular a valve for miniature fluid applications, with an electrodynamic actuator is improved in that it can be operated in an even more energy-saving way, but yet can be realized at low cost.

According to one aspect, a valve comprises an electrodynamic actuator which includes a magnet arrangement for generating a magnetic field and a control element movable relative to the magnet arrangement. The control element includes an energizable coil which is arranged in the magnetic field and is firmly coupled to a coil carrier. The control element is movable between at least two defined positions. Permanent-magnetically interacting means are provided, which retain the control element in at least one of the defined positions, even when the coil is currentless. The permanent-magnetically interacting means need not be permanently magnetic themselves. It is sufficient when these means interact with a permanent magnet, such as in particular a part made of a soft-magnetic material.

The Invention is based on the finding that a valve which can take various operating positions can be operated in a particularly energy-saving way when the control element of the electrodynamic actuator provided for the drive or the actuation of the valve can automatically be held in an intended operating position after taking the same, without necessarily having to expend electric energy for this purpose.

In the electrodynamic actuator of the valve according to the invention the so-called Lorentz force, which on energization of the coil is obtained in the magnetic field of the stationary magnet arrangement, is already utilized in a particularly effective way for changing the operating position. For retaining the control element in an operating position, however, no more current flow through the coil of the control element is necessary at all, as the permanent-magnetically interacting means provided according to the invention automatically accomplish this task. The permanent-magnetically interacting means do not need any electric energy in order to apply the required holding force on the control element. Of course, an energization of the coil can yet be provided in order to support the holding force, although this is not absolutely necessary.

In operation of the valve according to the invention it therefore is sufficient for a change of the operating position to apply only a short current pulse onto the coil of the electrodynamic actuator. In the operating position taken thereupon the control element of the drive then is held solely by the permanent-magnetically interacting means.

The realization of such a drive does not require a great constructional expenditure. In particular, the electrodynamic actuator of the valve according to the invention advantageously can be designed such that no additional installation space is required.

The fundamental drive concept of the electrodynamic actuator is particularly effective when the coil used is an air coil which is firmly coupled to a non-magnetic coil carrier. An air coil is known to be a wire wound several times around a core made of a non-soft-magnetic material (in general air). The non-magnetic coil carrier is not magnetizable either by applying or introducing into a magnetic field and can be formed e.g. of plastic material. What is also possible in principle, however, is a configuration of the electrodynamic actuator in which a conventional coil with a soft-magnetic core is used and the coil carrier is not necessarily made of a non-magnetic material.

As the coil carrier is firmly coupled to the air coil, it can be used directly for deflecting a sealing element etc. when it is designed correspondingly.

"Defined positions" in the sense of the invention are concrete, stable and reproducibly achievable (hence no arbitrary) positions of the control element. These positions correspond to intended operating positions of the valve according to the invention. For example, there can be provided a first operating position in which a sealing seat is completely closed by a sealing element (valve body), and a second operating position in which the sealing seat is completely open.

According to a preferred embodiment of the invention the permanent-magnetically interacting means include a soft-magnetic part which is firmly coupled to the control element at least in the direction of movement of the control element and interacts with the magnetic field of the magnet arrangement. A firm coupling here is understood to be a non-positive or rather positive coupling which ensures that a force acting on the soft-magnetic part is mechanically transmitted to the control element, wherein a loss-free transmission is desirable, but not absolutely necessary. With this embodiment the desired retention of the control element in at least one defined position can be achieved surprisingly easily. The magnetic field of the magnet arrangement present anyway, which actually is provided for moving the control element (coil and coil carrier), is utilized to retain the control element in the defined position after reaching the same. An additional magnet for generating another magnetic field hence is not necessary for this function. In this embodiment, the magnetic field of the magnet arrangement rather interacts with the soft-magnetic part, i.e. it exerts an attractive force on the soft-magnetic part in the desired way. Due to the firm coupling of the soft-magnetic part to the coil carrier, a holding force thus automatically acts on the control element so that the same is stably held in the defined position. This requires a firm coupling between the soft-magnetic part and the control element only in the direction of movement of the control element, while a relative movement can be permitted in a transverse direction. Such a transverse movement can be quite expedient to avoid an undesired transverse force, which will yet be discussed in more detail below. The soft-magnetic part can easily be integrated into the control element. Care should merely be taken that the soft-magnetic part is not or at least not substantially magnetically shielded to the outside. As a result, the holding function according to the invention hence can be achieved without having to provide an additional installation space. Under certain conditions, an arrangement of the soft-magnetic part outside the control element can also be expedient, wherein the installation space would slightly be increased in this case.

Kind and shape of the soft-magnetic part can largely be chosen freely, but taking account of the given circumstances can also be adapted such that an inexpensive manufacture becomes possible and in operation of the valve with the electrodynamic actuator according to the invention an effective generation of the holding force is achieved. The soft-magnetic part can be configured in particular as a wire, a plurality of wire pieces, a plurality of balls, a rod, sheet metal strip, soft-magnetic powder, soft-magnetic chips or as a plastic part filled with soft-magnetic material.

The magnetic field generated by the magnet arrangement should possibly include a magnetic field area of different flux density. Preferably, the soft-magnetic part then is arranged in this area of the magnetic field. Due to the magnetic interaction, the soft-magnetic part automatically strives for a movement in a direction in which the magnetic flux density increases. The responsible force acting on the soft-magnetic part can selectively be utilized as a holding force for the control element and possibly as a sealing force for a sealing element for sealing a valve seat against the pressure of the medium.

According to a particularly advantageous aspect of the invention the magnetic field area has at least one local maximum of the change in flux density, and the arrangement of the soft-magnetic part is chosen such that in one of the defined positions of the control element it is in or very close to the maximum of the change in flux density. As the force acting on the soft-magnetic part and hence the holding force exerted on the control element is strongest where the change in flux density is maximal, a position of the control element in which the soft-magnetic part is disposed at the site of this maximum as exactly as possible is best suited as an intended operating position e.g. of a valve. Of course, this finding can be transferred to further operating positions, i.e. further defined positions of the control element can be provided corresponding to the sites of further local maxima of the change in flux density.

The soft-magnetic part preferably has an oblong shape, wherein the direction of the longitudinal extension of the soft-magnetic part is substantially perpendicular to the main direction of movement of the control element and perpendicular to the main direction of the magnetic field. Expressed in other words this means that the soft-magnetic part chiefly extends in a direction perpendicular to the increasing change in flux density. On a soft-magnetic part designed in this way the holding force caused by the magnet arrangement acts particularly effectively along a large, ideally the entire length of the soft-magnetic part.

For the magnet arrangement which primarily provides the magnetic field required for the movement of the control element there is preferably used a permanent magnet or a plurality of permanent magnets. Thus, no electric current is required for generating this magnetic field. Although a single permanent magnet is sufficient in principle for the provision of the magnetic field, a magnet arrangement with a plurality of suitably arranged permanent magnets is preferred.

A simple, but effective design of the magnet arrangement provides at least one first and one second permanent magnet, which are arranged facing each other such that between opposite poles of the first and the second permanent magnet a longitudinal gap is formed, in which the control element moves. With this arrangement of the permanent magnets a magnetic field with almost continuously parallel field lines s formed in the longitudinal gap. At the beginning and at the end of the longitudinal gap the flux density however each decreases. The soft-magnetic part is pulled in the direction of that point in the longitudinal gap at which the change in flux density is greatest. Hence, when the soft-magnetic part is disposed e.g. at the beginning of the air gap, it is pulled in the direction of the center of the longitudinal gap.

According to an advantageous development of this magnet arrangement at least one third and one fourth permanent magnet additionally are provided, which are arranged facing each other such that between opposite poles of the third and the fourth permanent magnet the longitudinal gap continues. The third and the fourth permanent magnet are arranged beside the first and the second permanent magnet in the longitudinal direction of the longitudinal gap such that respectively opposite poles face each other even there. With this arrangement of the permanent magnets the field direction of the magnetic field in the longitudinal gap is reversed by 180°. In this area of reversal the magnetic field is relatively weak, which is why the area can be referred to as "neutral region". Concretely, the neutral region extends along the border at which the magnets face each other on one side of the longitudinal gap. On both sides of the neutral region (in the longitudinal direction of the gap) the flux density greatly increases so that according to the explained action principle defined positions of the control element can be provided there.

Correspondingly an arrangement of the soft-magnetic part in the longitudinal gap is advantageous such that during a movement of the control element between the at least two defined positions it passes through such a neutral region, i.e. a region in which the magnetic field is weaker (as distinctly as possible) than in adjoining regions.

In an embodiment in which the first and the second permanent magnet and possibly the third and the fourth permanent magnet each are equally strong, the soft-magnetic part should best be arranged in the middle of the width of the longitudinal gap, wherein "width" is understood to be the distance between the first and the second permanent magnet and possibly between the third and the fourth permanent magnet. As in this case the attractive forces of the permanent magnets arranged on the one side of the longitudinal gap, which act on the soft-magnetic part, and the attractive forces of the permanent magnets arranged on the other side of the longitudinal gap ideally cancel each other out, a resultant undesired transverse force acting on the soft-magnetic part is eliminated or at least kept as low as possible.

In the case of a magnet arrangement with permanent magnets facing each other and a longitudinal gap inbetween, in which the control element with the soft-magnetic part moves, the requirements concerning a holding force as large as possible and a transverse force as small as possible are contrary. A good compromise can be achieved, however, with a design of the soft-magnetic part in which the breadth of the soft-magnetic part in the direction of the width of the longitudinal gap is equal to or less than 0.5 times the width. Preferably, the breadth of the soft-magnetic part is less than 0.3 times the width of the longitudinal gap.

Moreover, the length of the soft-magnetic part perpendicular to the direction of the width and perpendicular to the longitudinal direction of the longitudinal gap should be equal to or greater than twice the breadth. Preferably, the length of the soft-magnetic part is greater than 7 times the breadth.

The soft-magnetic part can be arranged in the core of the coil in a space-saving way, wherein the coil preferably is an air coil wound around a non-magnetic core. In this case, the soft-magnetic part is not to be regarded as a coil core as it fulfills another function and due to its small size cannot act as a coil core at all.

With regard to certain arrangements with a soft-magnetic part completely rigidly connected to the control element, in which in the course of the movement of the control element in the magnetic field of the magnet arrangement an undesired transverse force acting on the soft-magnetic part would be inevitable, an advantageous development of the invention provides that the soft-magnetic part is held in a holder which permits a movement of the soft-magnetic part relative to the magnet arrangement in at least one degree of freedom. In this way a "floating bearing" can be achieved, which during a movement of the control element in the magnetic field permits transverse movements of the soft-magnetic part so that no undesired forces or moments are introduced into the bearing, or at least so only to a small extent.

In particular, such a holder should be substantially immovable in the direction of movement of the control element relative to the control element and should be movable in at least one direction transversely to the direction of movement relative to the control element.

The invention can be applied to valves with electrodynamic linear actuators, in which the control element is mounted so as to be linearly movable, just as to valves with pivoting actuators in which the control element is mounted so as to be rotatable about an axis. In the latter case the maximum angle of rotation of the control element typically is equal to or less than 45°.

In the embodiment with a pivoting actuator, in which the control element is mounted so as to be rotatable about an axis, a design is advantageous in which the soft-magnetic part is received in the holder such that it is inclined in one direction with respect to a middle axis of the air coil. It can be achieved thereby that in at least two defined positions of the control element the same holding forces act.

In this case, the inclination in particular is chosen such that in the at least two defined positions the soft-magnetic part is inclined with respect to a direction perpendicular to the main direction of movement of the control element and to the main direction of the magnetic field.

The invention is especially suitable for a valve, in particular a microvalve, which comprises a fluid housing with fluid ports, at least one valve seat and a sealing element cooperating with the valve seat, wherein the sealing element is coupled to the control element.

BRIEF DESCRIPTION OF THE DRAWINGS

Further features and advantages of the invention can be taken from the following description and from the enclosed drawings to which reference is made. In the drawings.

DETAILED DESCRIPTION

FIGS. 1a to 1c and 5a to 5c show two embodiments of a valve, here of a microvalve, whose fundamental structure and fundamental mode of operation are similar to the valve embodiments shown in DE 10 2014 113 103 A1 so that in the following chiefly the differences, in particular with respect to the stable operating positions of the microvalve, will be discussed in more detail.

Figure 1A:
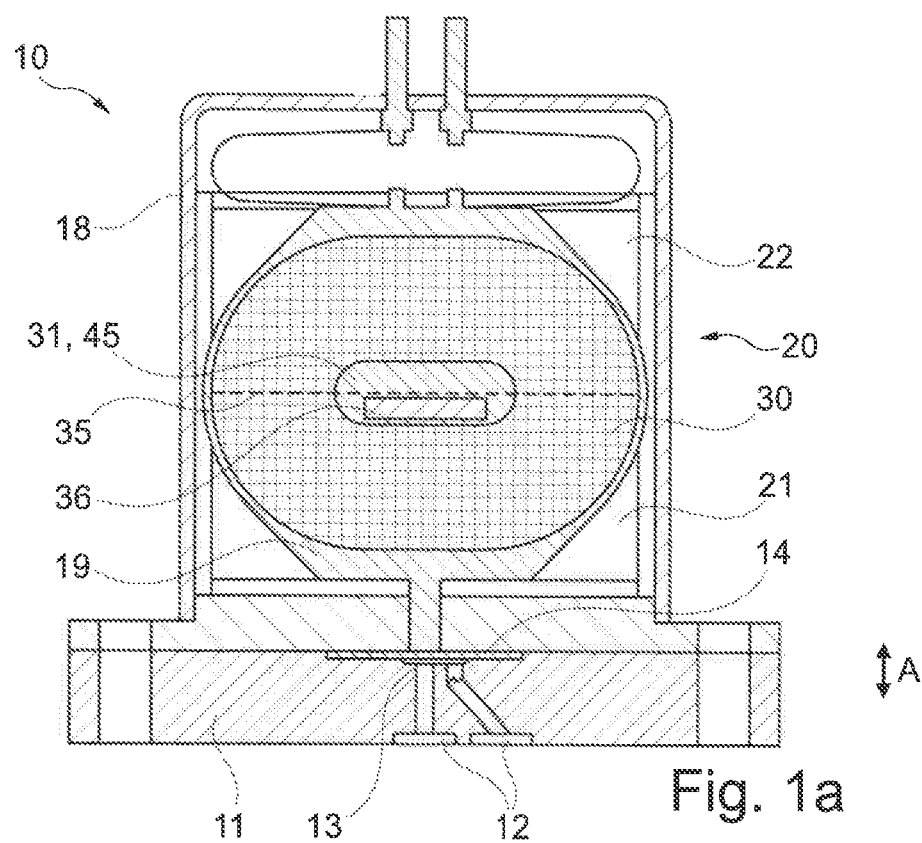
FIG. 1a shows a valve according to the invention with an electrodynamic actuator according to a first embodiment in a longitudinal section.
Figure 1B:
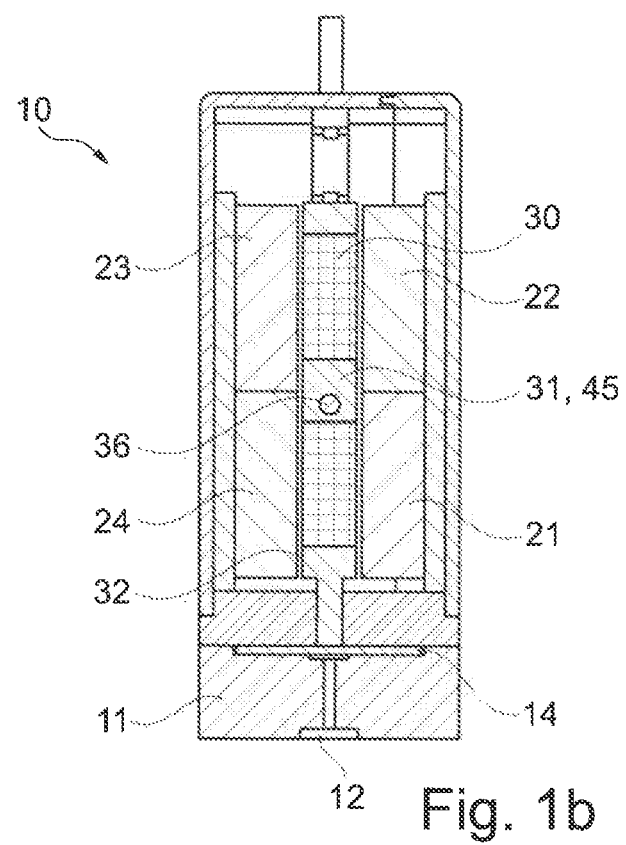
FIG. 1b shows the valve of FIG. 1a in a cross-section.
Figure 1C:
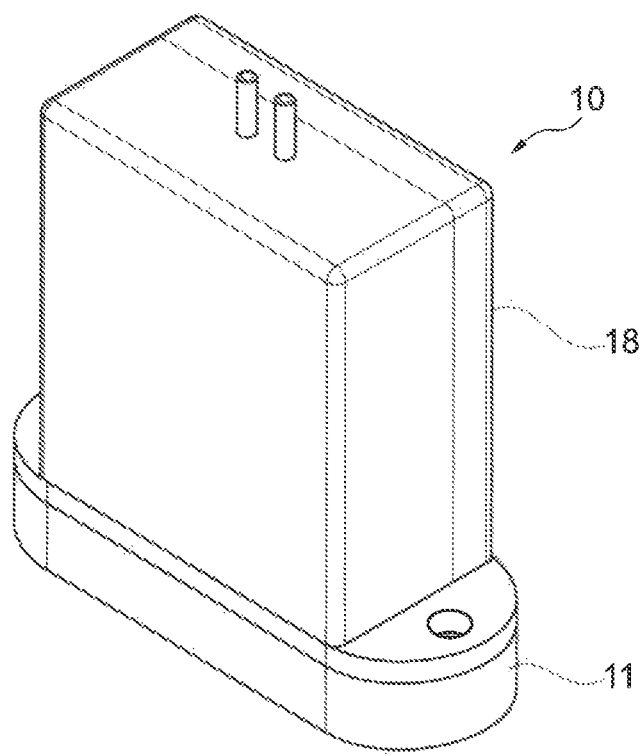
FIG. 1c shows the valve of FIG. 1a in a perspective view.

FIGS. 1a to 1c show a first embodiment of a microvalve 10 comprising a fluid housing 11 with fluid ports 12, at least one valve seat 13 and a sealing element 14 cooperating with the valve seat 13. The microvalve 10 furthermore comprises a bistable electrodynamic linear actuator 20 accommodated in an actuator housing 18 placed on the fluid housing 11.

The actuator 20 comprises at least one stationary permanent magnet 21, usually four oblong permanent magnets 21, 22, 23 and 24, and an air coil 30 movably arranged in the magnetic field of the permanent magnets 21 to 24. The air coil 30 is firmly mounted on a coil carrier 19 made of a non-magnetic material. The coil carrier 19 is mounted so as to be linearly movable in a direction A. To the coil carrier 19 the sealing element 14 is firmly coupled. The coil carrier 19 with the air coil 30 mounted thereon thus acts as a control element for the sealing element 14.

When an electric current flows through the air coil 30, the same moves in the magnetic field of the permanent magnets 21 to 24 together with the coil carrier 19 and thus actuates the sealing element 14 coupled thereto. The space surrounded by the air coil 30 is formed by a non-magnetic core 31 (e.g. air, plastic, etc.).

What is particularly important for the bistability of the actuator 20 is a soft-magnetic part 36 which is firmly coupled to the air coil 30 or to the coil carrier 19. The firm coupling is based on a non-positive connection, or rather on a positive connection, which ensures that a force acting on the soft-magnetic part 36 is mechanically transmitted to the control element. In the Ilustrated exemplary embodiment the soft-magnetic part 36 is arranged in the non-magnetic core 31 of the air coil 30, wherein the core 31 is several times larger than the soft-magnetic part 36. The purpose and function of the soft-magnetic part 36 can be taken from the following explanations.

Figure 2:
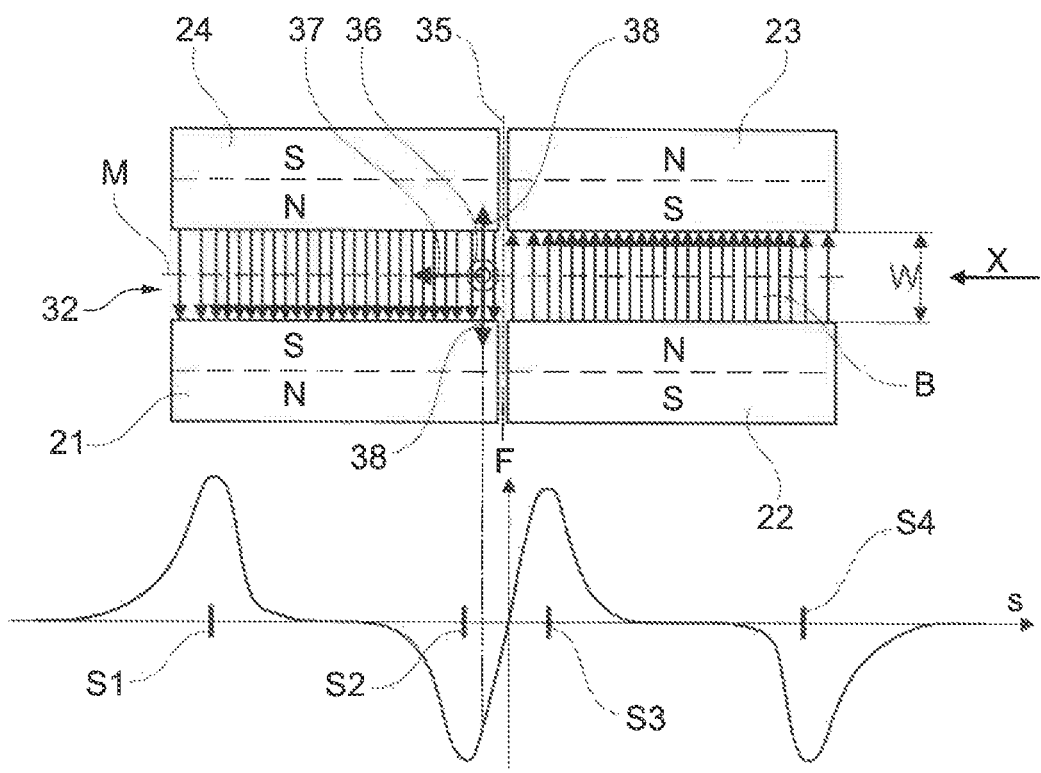
FIG. 2 shows a schematic diagram of a magnet arrangement of an electrodynamic actuator for a valve according to the invention with four magnets and an associated force-path diagram.
Figure 3:
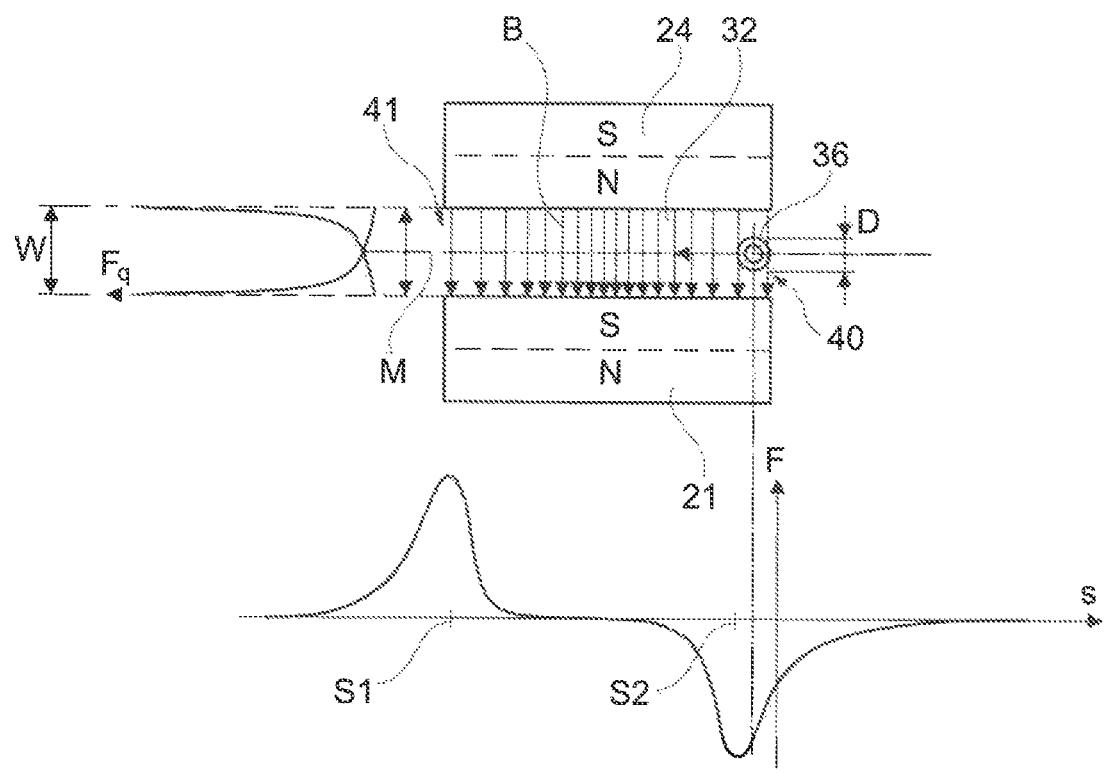
FIG. 3 shows a schematic diagram of a magnet arrangement of an electrodynamic actuator for a valve according to the invention with two magnets and an associated force-path diagram.
Figure 4:
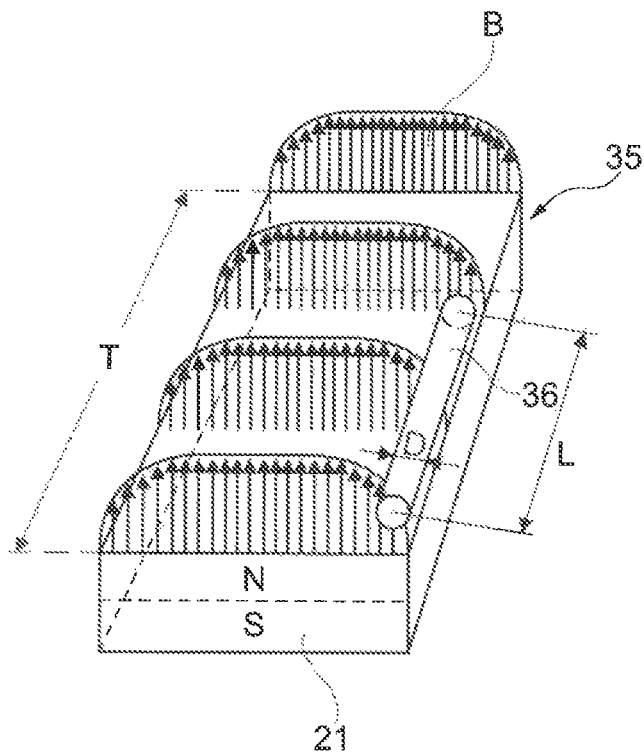
FIG. 4 shows a schematic diagram of a magnet and a soft-magnetic part for an electrodynamic actuator of a valve according to the invention.

FIGS. 2 to 4 show the action principle of the actuator 20 bistable here. Usually, the four equally shaped and dimensioned permanent magnets 21, 22, 23, 24 are arranged such that between the magnets 21 and 22 as well as 23 and 24 a longitudinal gap 32 is obtained, in which the air coil 30 (not shown) moves (see FIG. 2). The longitudinal direction X of the longitudinal gap 32 designates that direction which is perpendicular to the direction of the width W (distance of the opposed magnets 21 and 24 as well as 22 and 23) and perpendicular to the direction of the depth T of the longitudinal gap 32 (see FIG. 4) and corresponds to the main direction of movement of the air coil 30.

The magnet arrangement generates a magnetic field with almost continuous parallel field lines in the longitudinal gap 32. The main direction of the magnetic field is substantially parallel to the direction of the width W of the longitudinal gap 32. A magnetic yoke made of magnetic material increases the efficiency of the drive. For example, the actuator housing 18 can serve as yoke plate.

The magnets 21, 22, 23, 24 are arranged such that the field direction in the longitudinal gap 32 is reversed along its course (by 180°). In the area in which the magnetic field changes its direction a region with a weak magnetic field is obtained, which in the following is referred to as neutral region 35. In the illustrated exemplary embodiment the neutral region 35 extends along the border of two adjacent magnets 21, 22 and 23, 24.

When a soft-magnetic part like the part 36 described above is introduced into a region with a magnetic field of varying flux density B, this part 36 experiences a force F in the direction 37 towards the higher flux density B of the magnetic field. The part 36 also experiences a transverse force Fq in the direction 38 towards the surrounding magnets 21, 22, 23, 24. The directions 37 and 38 extend perpendicularly to each other. While the force F in the direction 37 brings the air coil 30 into a desired stable position, the transverse force Fq is not desired and should be kept as small as possible, which will yet be discussed in more detail below.

Proceeding from a fictitious neutral position (which it will never take permanently in operation of the actuator) the soft-magnetic part 36 is arranged in the area of the neutral region 35 (see also FIG. 1a). As the magnetic flux density B in the longitudinal gap 32 greatly increases to the left and right from the neutral region 35, two positions can be realized by this arrangement, in each of which a high force F acts on the soft-magnetic part 36. When the soft-magnetic part 36 is disposed to the left of the neutral region 35, it experiences a force to the left, as shown in FIG. 2. When the soft-magnetic part 36 is disposed to the right of the neutral region 35, it experiences a force to the right (not shown).

When the soft-magnetic part 36 gets into an area of the longitudinal gap 32 with a constant flux density B, as seen in the direction 37, no force acts on the magnetic part 36 in this direction. For realizing a bistable valve 10, the actuator therefore is designed such that in the desired stable positions the soft-magnetic part 36 is disposed in an area with strongly changing flux density B. The greater the change in flux density ΔB, the greater the holding force F exerted on the soft-magnetic part 36 and thus e.g. on the sealing element 14. Advantageously, the soft-magnetic part 36 is positioned such that with a closed valve seat 13 it is disposed in the area of the greatest change in flux density ΔB. Thereby, a stable self-holding valve position and sealing can also be achieved in a currentless way. The soft-magnetic part 36 and the magnet arrangement are adjusted to each other such that the holding force F acting on the soft-magnetic part 36 and hence on the control element is sufficient in order to safely retain the sealing element 14 in the closed position (on the valve seat 13) or in the open position (away from the valve seat 13) against the pressure of the medium.

The diagram of the force profile likewise shown in FIG. 2, which relates to the illustrated magnet arrangement with four permanent magnets 21, 22, 23, 24, reveals a total of four local maxima, here designated as points S1 to S4, with a particularly high force F (strong change in flux density B). Each of these points can be utilized for a stable position of the control element, as the holding force F acting on the sealing element 14 each is maximal there. In practice, the points S2 and S3 disposed closer to the neutral region 35 preferably are utilized as stable operating positions.

FIG. 3 shows another possible magnet arrangement with only two permanent magnets 21, 24 facing each other. In this arrangement, the soft-magnetic part 36 is attracted to a point in the area at the beginning 40 or at the end 41 of the air gap 32 (each towards the largest change in flux density B).

The diagram of the force profile likewise shown in FIG. 3, which relates to the illustrated magnet arrangement with two permanent magnets 21, 24, reveals a total of two points S1 and S2 with a particularly high force F. These two points can be utilized for a stabile position of the control element.

The force-path diagrams in FIGS. 2 and 3 are to be understood such that the force F is shown positive when the direction of the force F corresponds with the direction of the path s (force F directed to the right).

To keep the transverse force Fq acting on the soft-magnetic part 36 as low as possible, the soft-magnetic part 36 preferably is arranged in the longitudinal gap 32 such that the attractive forces of the upper magnets 23, 24 and of the lower magnets 21, 22 cancel each other out. With equally strong magnets 21 to 24 the optimum position is the middle M of the width W of the longitudinal gap 32.

As the transverse force Fq, as indicated in FIG. 2, rises exponentially towards a magnet, it is advantageous to maintain the largest possible distance to the magnets. However, this is in contrast to the desire to achieve a force F as large as possible. To nevertheless achieve a high force F with a transverse force Fq as small as possible, the soft-magnetic part 36 preferably is of oblong design. The breadth D of the soft-magnetic part 36, in the direction of the width W, maximally is 0.5×W, preferably less than 0.3×W. The length L in the direction of the depth T is at least 2×D, preferably at least 7×D (see FIGS. 3 and 4).

Of course, the soft-magnetic part 36 need not necessarily be configured in one piece and have a particular shape. For example, it can be configured as a wire, a plurality of wire pieces, a plurality of balls, a rod, sheet metal strip, soft-magnetic powder or chips or as a plastic part filled with soft-magnetic material.

As soft-magnetic material e.g. iron or a magnetic steel can be used, which is much less expensive than a permanent magnet. Anyway, an additional permanent magnet could not turn a valve which is based on the Lorentz force principle into a bistable valve.

The soft-magnetic part 36 preferably extends perpendicularly to the area with the greatest change in flux density ΔB. Particularly advantageously, the soft-magnetic part 36 in a fictitious neutral position extends parallel along the neutral region 35. As can be taken in particular from FIGS. 3 and 4, this direction of extension is perpendicular to the direction of the width W or the main direction of the magnetic field and perpendicular to the longitudinal direction X or the main direction of movement of the control element, i.e. parallel to the direction of the depth T of the longitudinal gap 32.

The soft-magnetic part 36 is held in the middle M by a holder 45 (see e.g. FIG. 1b). The holder 45 is designed such that it is freely movable in the direction 38 and is fixed in the non-magnetic core 31 (of the air coil 30) in the direction 37. No significant transverse forces Fq thereby are transmitted to the air coil 30 or to the non-magnetic core 31 and the bearing thereof. The holder 45 can also be part of the air coil 30 or of the coil carrier 19 (in particular in one piece). The holder 45 is equipped with sliding surfaces which slide on the magnets 21 to 24 with low friction (e.g. PTFE).

Figure 5A:
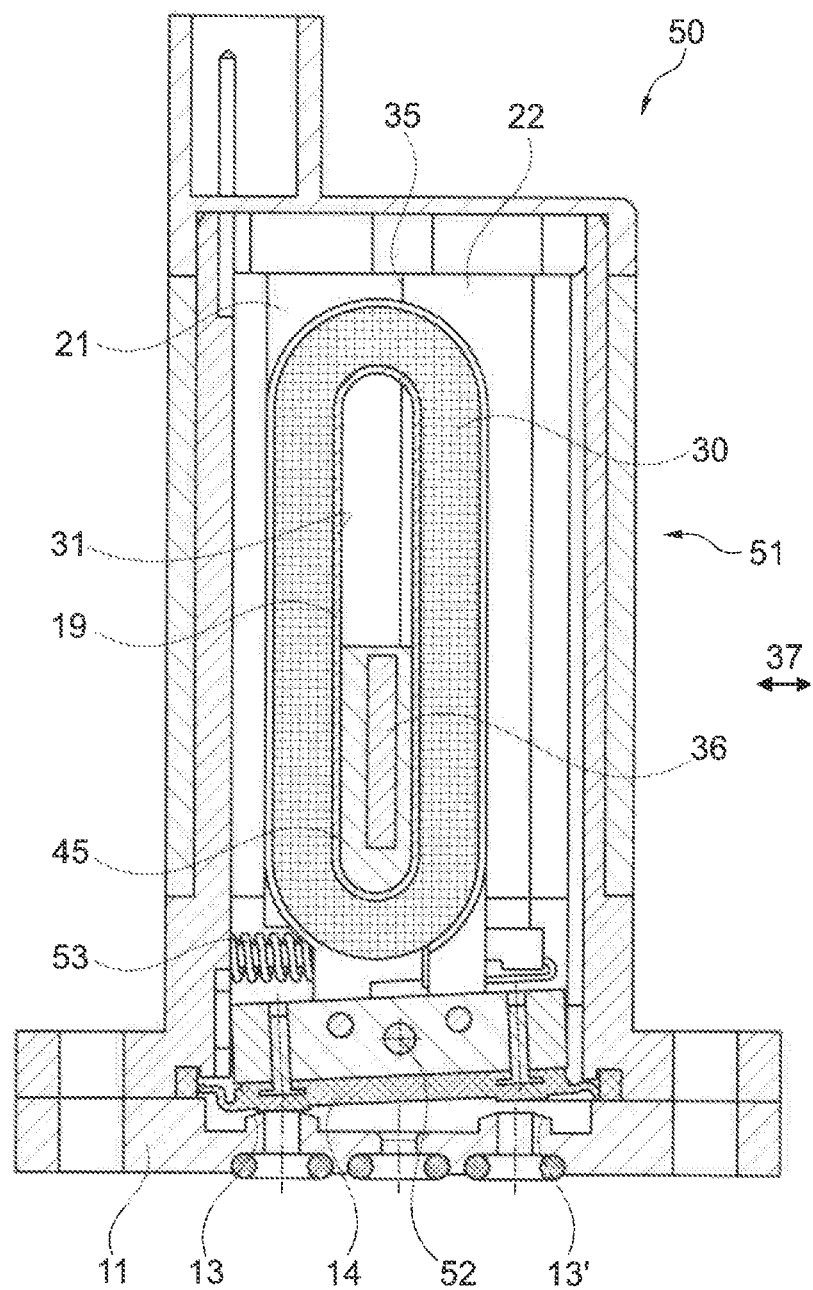
FIG. 5a shows a valve according to the invention with an electrodynamic actuator according to a second embodiment in a longitudinal section in a first position.
Figure 5B:
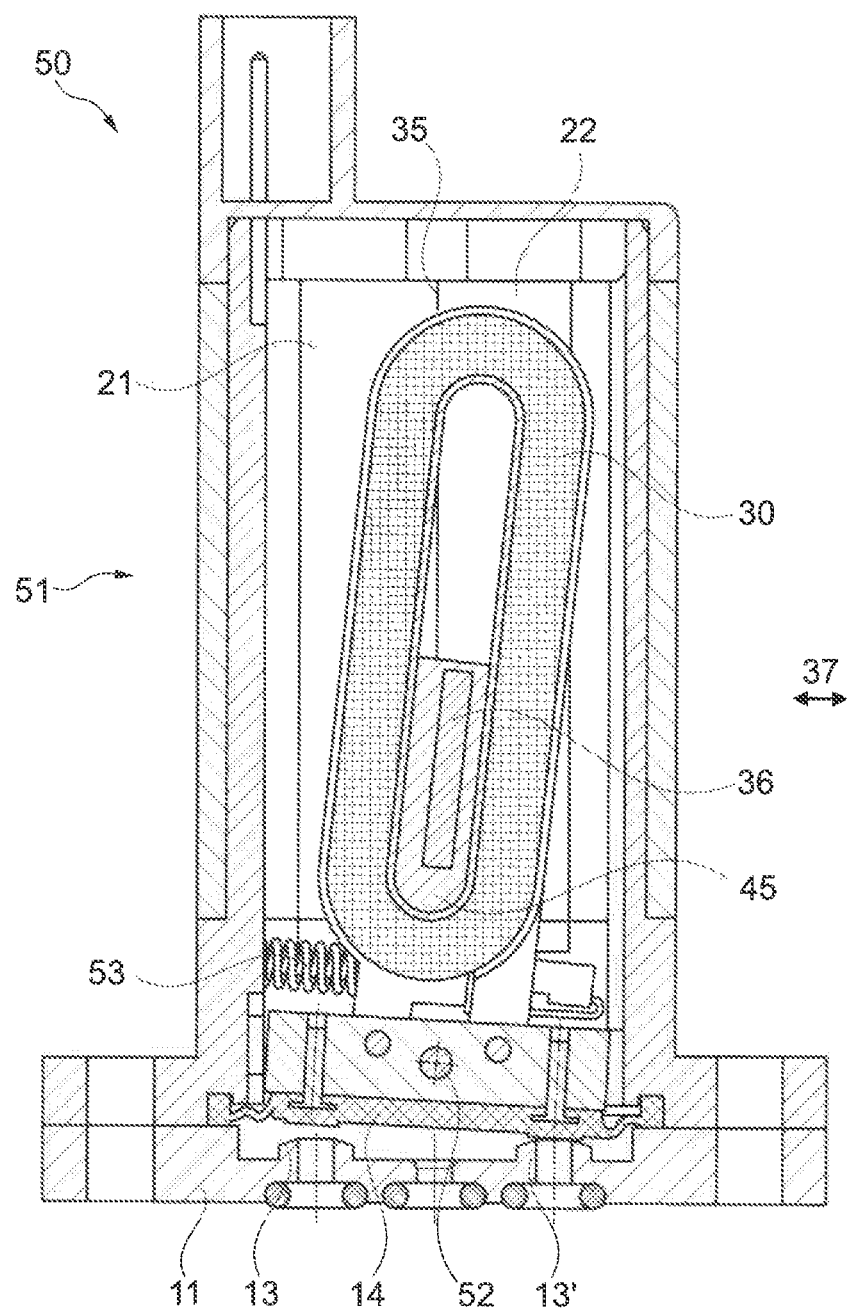
FIG. 5b shows the valve of FIG. 5a in a second position.
Figure 5C:
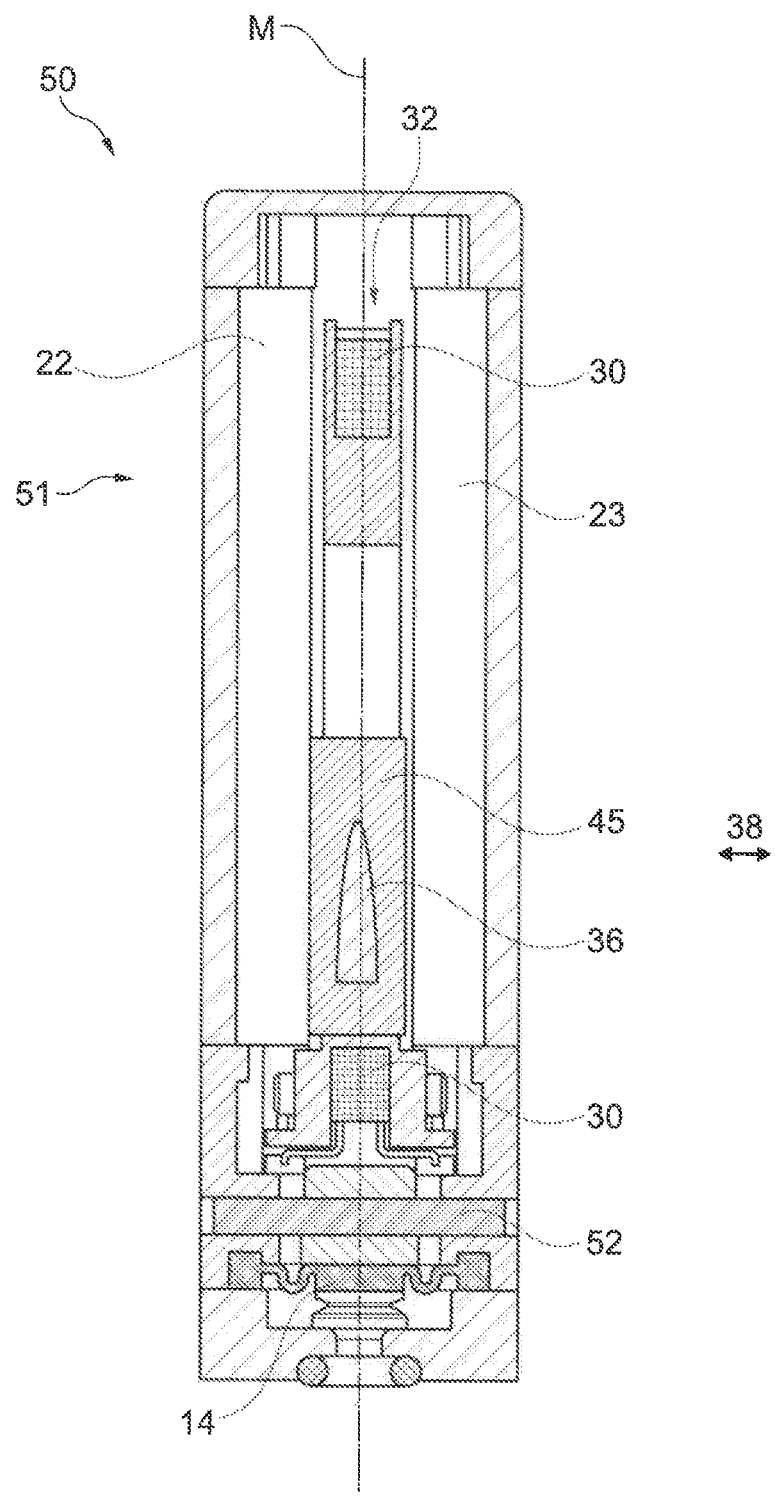
FIG. 5c shows the valve of FIG. 5a in a cross-section in the second position.

FIGS. 5a to 5c show a second embodiment of a microvalve 50, here with an electrodynamic pivoting actuator 51. Like in the valve 10 according to the first embodiment, the magnet arrangement in this embodiment, too, preferably comprises four permanent magnets 21, 22, 23, 24. The air coil 30 likewise is movably arranged in a longitudinal gap 32 formed by the magnet arrangement.

In contrast to the first embodiment, the coil carrier 19 is mounted so as to be rotatable together with the air coil 30 and the sealing element 14 coupled thereto. The air coil 30 can rotate about an axis 52 in a certain angular range (typically less than 45°).

FIG. 5a shows the valve 50 in its left, stable end position. The left valve seat 13 is closed by the sealing element 14. In this position, the soft-magnetic part 36 is disposed to the left of the neutral region 35 and positioned such that the force F keeps the left valve seat 13 closed in a currentless way and acts on the sealing element 14 as a sealing force.

FIG. 5b shows the valve 50 in is right, stable end position. The right valve seat 13' is closed by the sealing element 14. In this position, the soft-magnetic part 36 largely is disposed to the right of the neutral region 35 after a displacement in the direction 37 and is positioned such that the force F keeps the right valve seat 13' closed in a currentless way and in turn acts on the sealing element 14 as a sealing force. As can be seen in this Figure, in the case of a pivoting actuator and a stationary magnet arrangement the soft-magnetic part 36 cannot always be aligned parallel to the neutral region 35.

An electrically conductive spring element 53, here in the form of a coil spring mounted on an axle, serves for electrically contacting the air coil 30. In addition, the spring element 53 supports holding of the pivoting actuator 51 in the right stable end position. The spring element 53 however is not needed for switching as such, as the holding force acting on the control element is solely provided by the permanent-magnetically interacting means. The spring element 53 therefore is designed very weak. Instead of a coil spring, two strands can alternatively also be soldered to the air coil 30.

FIG. 5c shows how the soft-magnetic part 36 and the holder 45 are pulled in the direction 38 to the left (or also to the right) towards the adjacent magnet due to their "floating bearing", wherein no additional forces or moments are thereby introduced into the bearing of the axle 52.

Figure 6A:
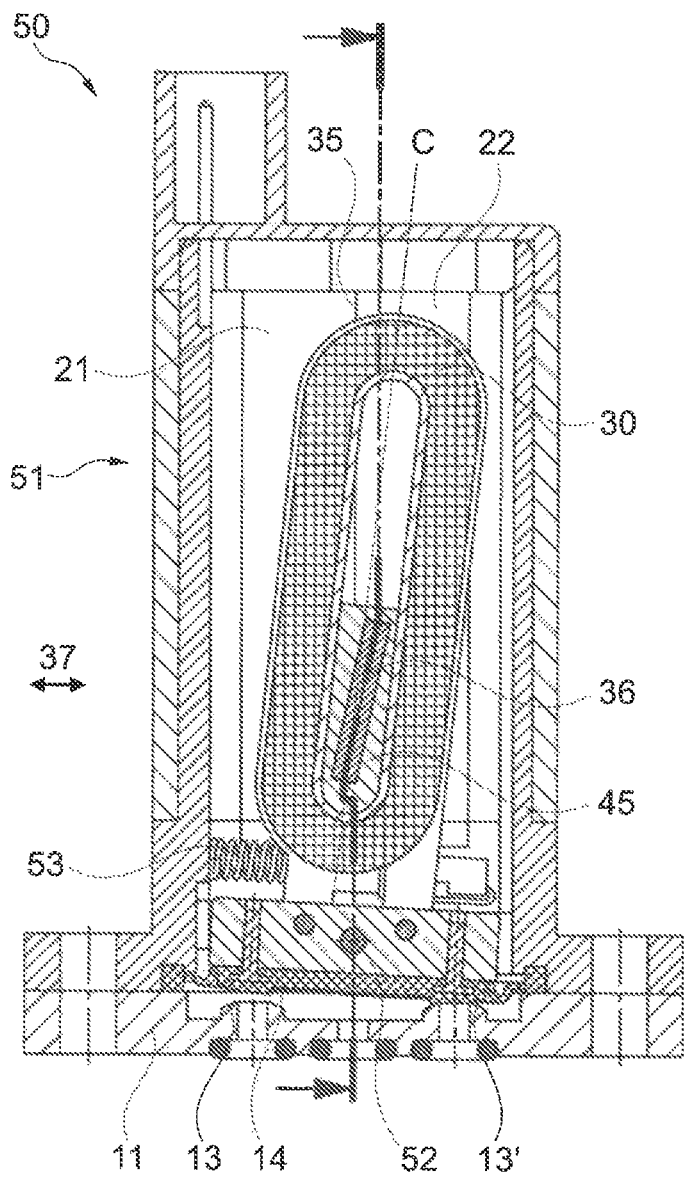
FIG. 6a shows a valve according to the invention with an electrodynamic actuator according to a variant of the second embodiment in a longitudinal section.
Figure 6B:
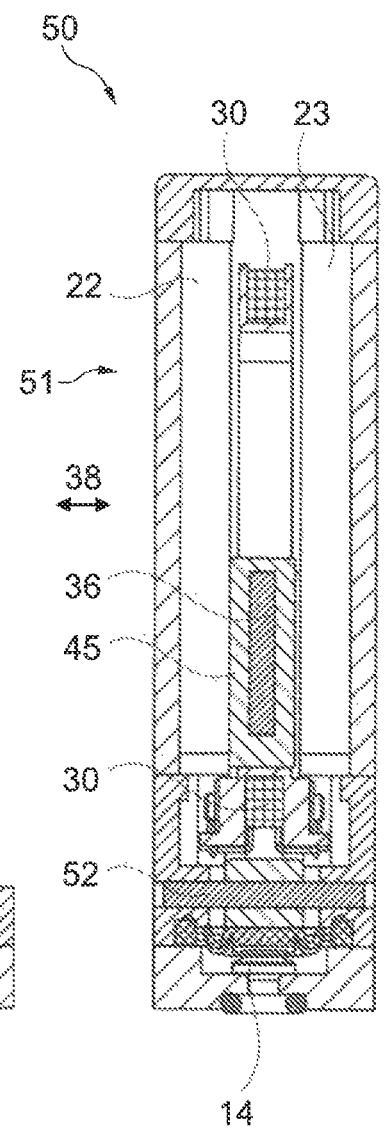
FIG. 6b shows the valve of FIG. 6a in a cross-section.

FIGS. 6a and 6b show a variant of the second embodiment of the microvalve 50 in a position which corresponds to the stable right end position of the microvalve 50 shown in FIGS. 5b and 5c.

Figure 6C:
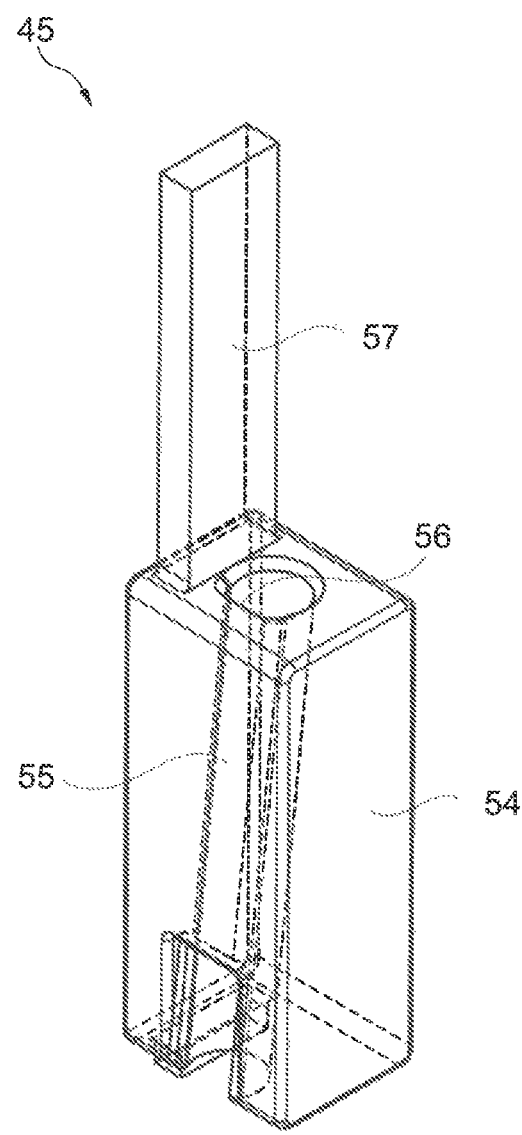
FIG. 6c shows the holder for the soft-magnetic part of the valve of FIG. 6a in a perspective, transparent view.

The particularity of this variant is the design of the holder 45 for the soft-magnetic part 36, which is shown separately in FIG. 6c. The holder 45 has a solid base body 54 with a receptacle 55 formed therein for the soft-magnetic part 36 (not shown here).

The soft-magnetic part 36 preferably formed as a pin preferably has a diameter of only about 1 mm and a length of only about 6.6 mm. The height of the base body 54 generally is dimensioned such that the soft-magnetic part 36 inserted into the receptacle 55 just does not protrude from the receptacle 55 and beyond the base body 54.

Along its entire length, or at least along a part thereof, the receptacle 55 has a flattened portion 56 for clamping the pin-shaped soft-magnetic part 36.

As already described above, the holder 45 is floatingly mounted, i.e. it is freely movable in the direction 38 and is fixed in the non-magnetic core 31 of the air coil 30 in the direction 37.

However, the receptacle 55 here extends obliquely into the substantially cuboid base body 54, i.e. the soft-magnetic part 36 is tilted in one direction with respect to the middle axis C of the base body 54 and the air coil 30. In the illustrated exemplary embodiment the inclination of the receptacle 55 is chosen such that both in the left stable end position and in the right stable end position shown in FIG. 6a the soft-magnetic part 36 is tilted to the right with respect to the direction perpendicular to the directions 37 and 38, in which the neutral region 35 extends. Owing to this design, substantially the same holding force is achieved in both end positions.

The holder 45 additionally includes a handle 57 which facilitates the assembly of the holder 45 with the soft-magnetic part 36 accommodated therein, which is difficult due to the very small dimensions.

The action principle of the electrodynamic actuator 20 or 51 described with reference to two embodiments of a microvalve 10 or 50 is not limited to the currentless holding of the control element in two operating positions (bistability). In principle, only one or more than two stable operating positions can be realized with the action principle according to the invention, which owing to the suitably employed permanent-magnetically interacting means can be maintained in a currentless way. The electrodynamic actuator 20 or 51 can also be used in larger valves or in other fluid components.

LIST OF REFERENCE NUMERALS 10 valve
11 fluid housing
12 fluid ports
13, 13' valve seat
14 sealing element 18 actuator housing
19 coil carrier
20 linear actuator
21 first permanent magnet
22 third permanent magnet
23 fourth permanent magnet
24 second permanent magnet
30 air coil
31 non-magnetic core
32 longitudinal gap
35 neutral region
36 soft-magnetic part
37 direction of the holding force F
38 direction of the transverse force Fq
40 beginning of the longitudinal gap
41 end of the longitudinal gap
45 holder
50 valve
51 pivoting actuator
52 axle
53 spring element
54 base body
55 receptacle
58 flattened portion
57 handle
B flux density
ΔB change in flux density
A direction of movement of the control element
D breadth
F holding force
Fq transverse force
L length
M middle
s path
S1 first point
S2 second point
S3 third point
S4 fourth point
T depth of the longitudinal gap
W width of the longitudinal gap
X longitudinal direction of the longitudinal gap
C middle axis of the air coil

The invention claimed is:

1. A valve, comprising an electrodynamic actuator which includes
a magnet arrangement for generating a magnetic field, wherein the magnetic field generated by the magnet arrangement includes a magnetic field area with a local area having a flux density (B) different than the remaining magnetic field area, wherein the soft-magnetic part is arranged in this area of the magnetic field, and
a control element movable relative to the magnet arrangement,
wherein the control element includes an energizable coil which is arranged in the magnetic field and is firmly coupled to a coil carrier,
wherein the control element is movable between at least two defined positions,
wherein permanent-magnetically interacting holding means are provided, which retain the control element in at least one of the defined positions, even when the coil is currentless, and
wherein the permanent-magnetically interacting holding means includes a soft-magnetic part which is firmly coupled to the control element at least in the direction of movement of the control element and interacts with the magnetic field of the magnet arrangement.

2. The valve according to claim 1, wherein the soft-magnetic part is configured as at least one of the following: wire, a plurality of wire pieces, a plurality of balls, a rod, a sheet metal strip, soft-magnetic powder, soft-magnetic chips, a plastic part filled with soft-magnetic material.

3. The valve according to claim 1, wherein the magnetic field area has at least one local maximum of the change in flux density (ΔB) and that the arrangement of the sot-magnetic part is chosen such that in one of the defined positions of the control element it is disposed in or very close to the maximum of the change in flux density (ΔB).

4. The valve according to claim 1, wherein the soft-magnetic part has an oblong shape, wherein the direction of the longitudinal extension of the soft-magnetic part is substantially perpendicular to the main direction of movement of the control element and perpendicular to the main direction of the magnetic field.

5. The valve according to claim 1, wherein the magnet arrangement is formed by an arrangement of one or more permanent magnets.

6. The valve according to claim 1, wherein the soft-magnetic part is arranged in the core of the coil.

7. The valve according to claim 1, wherein the soft-magnetic part is held in a holder which permits a movement of the soft-magnetic part relative to the magnet arrangement in at least one degree of freedom.

8. The valve according to claim 7, wherein the holder is substantially immovable relative to the control element in the direction of movement of the control element and is movable relative to the control element in at least one direction transverse to the direction of movement.

9. The valve according to claim 7, wherein the soft-magnetic part is received in the holder such that it is inclined in one direction with respect to a middle axis of the coil, wherein the coil is an air coil wound around a non-magnetic core.

10. The valve according to claim 9, wherein the inclination is chosen such that in at least two defined positions the soft-magnetic part is inclined with respect to a direction perpendicular to the main direction of movement of the control element and to the main direction of the magnetic field.

11. The valve according to claim 1, wherein the control element is mounted so as to be linearly movable.

12. The valve according to claim 1, wherein the control element is mounted so as to be rotatable about an axle.

13. The valve according to claim 12, wherein the maximum angle of rotation of the control element is equal to or less than 45°.

14. The valve according to claim 1, characterized by a fluid housing with fluid ports, at least one valve seat and a sealing element cooperating with the valve seat, wherein the sealing element is coupled to the control element.

15. A valve, comprising an electrodynamic actuator which includes
a magnet arrangement for generating a magnetic field, and
a control element movable relative to the magnet arrangement,
wherein the control element includes an energizable coil which is arranged in the magnetic field and is firmly coupled to a coil carrier,
wherein the control element is movable between at least two defined positions,
wherein permanent-magnetically interacting holding means are provided, which retain the control element in at least one of the defined positions, even when the coil is currentless, wherein the permanent-magnetically interacting holding means includes a soft-magnetic part which is firmly coupled to the control element at least in the direction of movement of the control element and interacts with the magnetic field of the magnet arrangement; and wherein the magnet arrangement includes at least one first and one second permanent magnet, which are arranged facing each other such that between opposite poles of the first and the second permanent magnet a longitudinal gap is formed, in which the control element moves.

16. The valve according to claim 15, wherein the magnet arrangement includes at least one third and one fourth permanent magnet, which are arranged facing each other such that between opposite poles of the third and the fourth permanent magnet the longitudinal gap continues, wherein in the longitudinal direction of the longitudinal gap the third and the fourth permanent magnet are arranged beside the first and the second permanent magnet such that opposite poles each face each other.

17. The valve according to claim 16, wherein during a movement of the control element between the at least two defined positions the soft-magnetic part passes through a region whose magnetic field is weaker than that of adjacent regions.

18. The valve according to claim 16, wherein the third and the fourth permanent magnet each are equally strong and the soft-magnetic part is arranged in the middle of the width (W) of the longitudinal gap between the third and the fourth permanent magnet.

19. The valve according to claim 15, wherein the first and the second permanent magnet each are equally strong and the soft-magnetic part is arranged in the middle of the width (W) of the longitudinal gap between the first and the second permanent magnet.

20. The valve according to claim 19, wherein the breadth (D) of the soft-magnetic part in the direction of the width (W) is equal to or less than 0.5 times the width (W), preferably less than 0.3 times the width (W).

21. The valve according to claim 20, wherein the length (L) of the soft-magnetic part perpendicular to the direction of the width (W) and perpendicular to the longitudinal direction of the longitudinal gap is equal to or greater than two times the breadth (D), preferably greater than several times the breadth (D).

22. A valve, comprising an electrodynamic actuator which includes
a magnet arrangement for generating a magnetic field, and
a control element movable relative to the magnet arrangement,
wherein the control element includes an energizable coil in the form of an air coil wound around a non-magnetic coil, which is arranged in the magnetic field and is firmly coupled to a coil carrier,
wherein the control element is movable between at least two defined positions,
wherein permanent-magnetically interacting holding means are provided, which retain the control element in at least one of the defined positions, even when the coil is currentless,
wherein the permanent-magnetically interacting holding means includes a soft-magnetic part which is firmly coupled to the control element at least in the direction of movement of the control element and interacts with the magnetic field of the magnet arrangement; and
wherein the soft-magnetic part is arranged in the core of the coil.

* * * * *